(12) United States Patent
Takeuchi

(10) Patent No.: US 11,491,813 B2
(45) Date of Patent: Nov. 8, 2022

(54) METHOD FOR PRODUCING PRINTED PRODUCT AND PRINTING SYSTEM

(71) Applicant: MIMAKI ENGINEERING CO., LTD., Nagano (JP)

(72) Inventor: Tetsuro Takeuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/902,233

(22) Filed: Jun. 15, 2020

(65) Prior Publication Data
US 2020/0398600 A1 Dec. 24, 2020

(30) Foreign Application Priority Data
Jun. 18, 2019 (JP) .............................. JP2019-112858

(51) Int. Cl.
*B41M 7/00* (2006.01)
*C09D 11/32* (2014.01)
(Continued)

(52) U.S. Cl.
CPC ............ *B41M 7/009* (2013.01); *B41J 2/2107* (2013.01); *B41M 5/0023* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057;
(Continued)

(56) References Cited

U.S. PATENT DOCUMENTS 6,332,943 B1 * 12/2001 Herrmann ............ C09D 11/326
156/277
2008/0171149 A1 * 7/2008 Hastie ....................... D06P 5/30
427/256
(Continued)

FOREIGN PATENT DOCUMENTS

JP 6376711 8/2018

*Primary Examiner* — Manish S Shah
(74) *Attorney, Agent, or Firm* — JCIPRNET

(57) ABSTRACT

A method for producing a printed product is provided. The method capable of producing the printed product is superior in a friction fastness and a texture. And, a printing system is also provided. The method includes a printing step in which an ink composition for inkjet, containing a colorant and a crosslinkable binder component, is inkjet-printed onto a textile good to obtain a print body; and a heat-treatment step in which, by heat-treatment of the print body with steam, the crosslinkable binder component is caused to melt or soften, and to crosslink to be a film, thereby fixing the colorant to fibers of the textile good. The printing system includes a printing apparatus and a heat-treatment equipment with which a print body after printing is heat-treated with steam.

13 Claims, 3 Drawing Sheets

(51) Int. Cl.
 *B41M 5/00* (2006.01)
 *C09D 11/102* (2014.01)
 *B41J 2/21* (2006.01)

(52) U.S. Cl.
 CPC ......... *B41M 5/0047* (2013.01); *C09D 11/102* (2013.01); *C09D 11/32* (2013.01)

(58) Field of Classification Search
 CPC .... B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237
 See application file for complete search history.

(56) References Cited

U.S. PATENT DOCUMENTS

2013/0115387 A1\* 5/2013 Dolsey ................. B41M 5/5254
 428/32.26
2017/0120655 A1\* 5/2017 Rueckert .............. B41M 5/5263

\* cited by examiner

FIG. 2

METHOD FOR PRODUCING PRINTED PRODUCT AND PRINTING SYSTEM

CROSS REFERENCE TO RELATED APPLICATIONS

This application claims the priority benefit of Japanese Patent Application No. 2019-112858, filed on Jun. 18, 2019. The entirety of the above-mentioned patent application is hereby incorporated by reference herein and made a part of this specification.

TECHNICAL FIELD

The present disclosure relates to a method for producing a printed product and to a printing system.

BACKGROUND ART

To add a binder component to an ink has been known as the method for improving fastness of a printed product. For example, Patent Literature 1 describes, as the method for improving a friction fastness of a printed product printed with an inkjet ink, a method in which a urethane resin is further contained in a certain pigment ink composition as the binder component therein.

It has also been known that after an inkjet ink containing a crosslinkable binder and a colorant is printed onto a textile, this textile is contacted directly with a heater thereby curing by crosslinking the binder, so as to fix the binder to the textile.

Patent Literature 1: Japanese Patent No. 6376711

SUMMARY

In conventional methods, however, there have been problems that fastness of the printed product was insufficient in spite that a crosslinkable binder component was used, and that the printed product became hard thereby deteriorating a texture.

The present disclosure was conceived under the circumstances as mentioned above; and thus, the present disclosure provides a method for producing a printed product. The method capable of producing a printed product is superior in a friction fastness and a texture. And, a printing system is also provided.

In order to solve the problems mentioned above, the inventor of the present disclosure considered that this poor curability is due to a small amount of the resin in the crosslinkable binder component. Therefore, an attempt was made to increase the resin amount, but the fastness of the printed product did not improve so much as expected. On the contrary, because of the increase in the crosslinkable binder component, the printed product became hard and the texture thereof was deteriorated.

Also, the inventor of the present disclosure considered that insufficient fastness of the printed product might be due to an insufficient reaction of the crosslinkable binder; and thus, attempts were made to raise the temperature of a heater and prolong the heating time, resulting in scorching of the printed product.

The inventor of the present disclosure further carried out an extensive investigation, and as a result of heating the textile under a steam atmosphere without contacting the heater directly to the textile, it was found that the fastness could be ensured without scorching the textile because a heating temperature and a heating time sufficient for a crosslinking reaction could be ensured even with a small amount of the resin.

The inventor of the present disclosure further carried out the investigation on the basis of the above-mentioned finding, and as a result, the present disclosure could be completed.

A method for producing a printed product according to a first aspect of the present disclosure includes: a printing step in which an ink composition for inkjet, containing a colorant and a crosslinkable binder component, is inkjet-printed onto a textile good to obtain a print body; and a heat-treatment step in which, by heat-treatment of the print body with steam, the crosslinkable binder component is caused to melt or soften, and to crosslink to be a film, thereby fixing the colorant to fibers of the textile good.

According to the method for producing a printed product with the composition described above, a printed product that is superior in a friction fastness and a texture can be produced.

It is preferable that the heat-treatment step with the steam be carried out by heating the print body via the steam without contacting the print body directly to a heat source.

According to the method for producing a printed product with the composition described above, a textile good can be prevented from quality deterioration; and thus, a printed product that is further improved in a friction fastness can be obtained.

It is preferable that the crosslinkable binder component be a two component crosslinkable binder component.

According to the method for producing a printed product with the composition described above, a life span of the ink can be prolonged; and in addition, a printed product that is further improved in a friction fastness can be obtained.

It is preferable that the crosslinkable binder component contain a crosslinking agent and a urethane resin.

According to the method for producing a printed product with the composition described above, a printed product that is further improved in a friction fastness can be obtained.

It is preferable that the ink composition for inkjet be a water-based ink further containing water.

According to the method for producing a printed product with the composition described above, the method is superior in an environmental friendliness during production thereof.

It is preferable that the textile good contain a binder component.

According to the method for producing a printed product with the composition described above, a binder component is contained in the textile good in advance so that the colorant can be wrapped with the crosslinkable binder component in the ink composition for inkjet and the binder component in the textile good. With this, the fixing strength of the colorant can be enhanced. Therefore, even if an amount of the crosslinkable binder component is decreased thereby decreasing a total amount of the binder, the printed product that is further improved in a texture can be obtained with retaining a friction fastness of the printed product to be obtained.

It is preferable that the textile good contain an organic salt or an inorganic salt as an adjuvant.

According to the method for producing a printed product with the composition described above, by destroying a dispersibility of the colorant in the ink composition having reached the textile good, the colorant can be fixed more firmly so that bleeding thereof can be prevented.

According to the method for producing a printed product of the present disclosure, the printed product that is superior in a friction fastness and a texture can be produced.

A printing system according to a second aspect of the present disclosure includes a printing apparatus and heat-treatment equipment with which a print body after printing is heat-treated with steam.

The printed product, which is the textile discharged from the heat-treatment equipment after the heat treatment, can be rolled up with a roller as it is without going through a special drying step. Namely, because a liquid component such as a solvent in the ink composition for inkjet having been printed to a textile good such as a textile is evaporated in the heat-treatment equipment, the printed product, which is the textile discharged from the heat-treatment equipment after the heat treatment, can be rolled up as it is.

BRIEF DESCRIPTION OF THE DRAWINGS

FIG. 2 is pictures of the printed products according to Comparative Example.

DESCRIPTION OF EMBODIMENTS

The method for producing a printed product according to an embodiment of the present disclosure includes: a printing step in which an ink composition for inkjet, containing a colorant and a crosslinkable binder component, is inkjet-printed onto a textile good to obtain a print body; and a heat-treatment step in which, by heat-treatment of the print body with a super-heated steam, the crosslinkable binder component is caused to melt or soften, and to crosslink to be a film.

Figure 1:
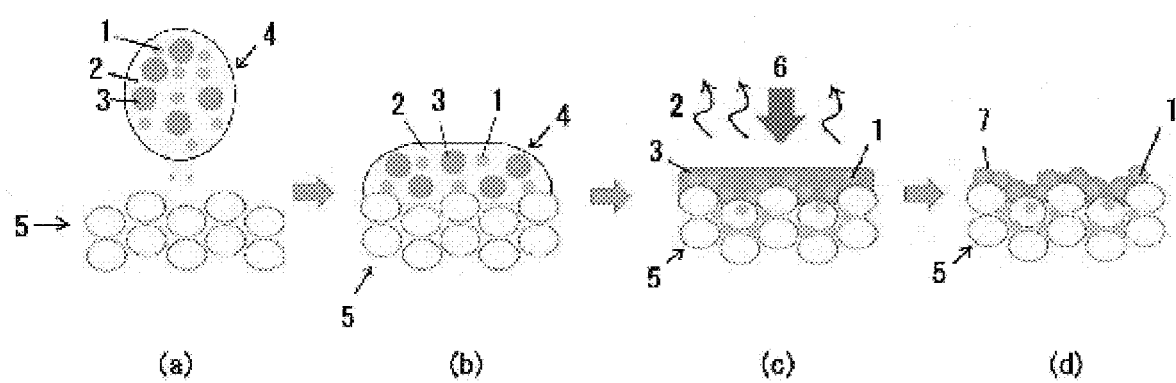
FIG. 1 is a conceptual drawing of the method for producing a printed product according to an embodiment of the present disclosure.

An embodiment of the method for producing a printed product according to the present disclosure will be explained with referring to FIG. 1. In FIG. 1, (a) and (b) illustrate the printing step, and (c) and (d) illustrate the heat-treatment step.

In FIG. 1, (a) illustrates the state that a droplet of an ink composition 4 for inkjet, containing a colorant 1, a solvent 2, and a crosslinkable binder component 3, is ejected from an inkjet nozzle to a textile good 5. The colorant 1 and the crosslinkable binder component 3 are dispersed in the solvent 2 as particles or microparticles.

In FIG. 1, (b) illustrates the state that the droplet of the ink composition 4 for inkjet is landed onto the textile good 5.

In FIG. 1, (c) illustrates the state that steam 6 is applied to the textile good 5 that is printed with the ink composition 4 for inkjet. The solvent 2 in the ink composition 4 for inkjet is evaporated with a heat of the steam 6 so that the crosslinkable binder component 3 is melted or softened and starts to form a film. At the same time, the textile good 5 and the fibers thereof swell with the water in the steam 6 so that the colorant 1 penetrates between the fibers and into the fibers of the textile good 5.

In FIG. 1, (d) illustrates the state that the heat of the steam 6 causes a crosslinking reaction of the crosslinkable binder component 3 so that a film 7 is cured.

Hereinafter, the printing step and the heat-treatment step will be explained in detail.

(Printing Step)

In the printing step according to this embodiment, a print body is obtained by inkjet-printing an ink composition for inkjet, containing a colorant and a crosslinkable binder component, onto a textile good.

Illustrative examples of the colorant to be used in this embodiment include pigments such as an inorganic pigment and an organic pigment, and microparticles having a metallic gloss.

There is no particular restriction in the pigment so far as the pigment is a particle not soluble in water nor in a solvent and it can be used as a colorant. For example, the pigment include an inorganic pigment and an organic pigment.

Illustrative examples of the inorganic pigment include titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, Bengal red, molybdenum red, chrome vermillion, molybdate orange, yellow lead, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, and mica.

Illustrative examples of the organic pigment include an azo type, an azomethine type, a polyazo type, a phthalocyanine type, a quinacridone type, an anthraquinone type, an indigo type, a thioindigo type, a quinophthalone type, a benzimidazolone type, an isoindoline type, an isoindolinone type, and carbon black.

When a cyan ink is used as the ink composition for inkjet to be used in this embodiment, illustrative examples of the pigment that can be blended therein include C. I. pigment blue such as 1, 2, 3, 15:3, 15:4, 15:34, 16, 22, and 60.

When a magenta ink is used as the ink composition for inkjet to be used in this embodiment, illustrative examples of the pigment that can be blended therein include C. I. pigment red such as 5, 7, 12, 48 (Ca), 48 (Mn), 57 (Ca), 57:1, 112, 122, 123, 168, 184, 202, 209, and C. I. pigment violet 19.

When a yellow ink is used as the ink composition for inkjet to be used in this embodiment, illustrative examples of the pigment that can be blended therein include C. I. pigment yellow such as 1, 2, 3, 12, 13, 14C, 16, 17, 73, 74, 75, 83, 93, 95, 97, 98, 109, 110, 114, 120, 128, 129, 130, 138, 150, 151, 154, 155, 180, and 185.

When a black ink is used as the ink composition for inkjet to be used in this embodiment, illustrative examples of the pigment that can be blended therein include HCF, MCF, RCF, LFF, and SCF (manufactured by Mitsubishi Chemical Corp.); Monarch and Regal (manufactured by Cabot Corp.); color black, special black, and Printex (manufactured by Degussa Huls Corp.); Toka black (manufactured by Tokai Carbon Co., Ltd.); and Raven (manufactured by Columbia Corp.).

Illustrative examples of other colorants include microparticles having a metallic gloss such as gold, silver, or aluminum, as well as colorless or pale colored extender pigments.

These colorants may be used singly or as a mixture of two or more of them.

There is no particular restriction in the content of the colorant in the ink composition for inkjet to be used in this embodiment, so far as the concentration thereof is such that the ink composition for inkjet can be ejected from an inkjet nozzle. The concentration is preferably in the range of 1% to 20% by mass, while more preferably in the range of 1% to 10% by mass, in the ink composition for inkjet.

(Crosslinkable Binder Component)

There is no particular restriction in the crosslinkable binder component to be used in this embodiment so far as the binder component is a compound or a composition that can fix the colorant to the fibers of the textile good after printing and that is crosslinkable.

The crosslinkable binder component may be a liquid or a solid. When the crosslinkable binder component is a solid or a liquid having a high viscosity, it is preferable that the binder component be dispersible or dissolvable in a solvent that is added if necessary, as described later.

Illustrative examples of the crosslinkable binder component include (i) a mixture of a crosslinking agent with a resin having a crosslinkable functional group, (ii) a self-crosslinkable resin, and (iii) a mixture of them with a catalyst. With regard to the resin contained in the crosslinkable binder component, it is preferable that the glass transition temperature (Tg) or the melting point of the resin be equal to or lower than the temperature of the heat-treatment step (for example 160° C.), and that the temperature at which a crosslinking reaction can take place be higher than the temperature of the printing step (for example 25° C.) and equal to or lower than the temperature of the heat-treatment step (for example 160° C.).

The crosslinkable binder component like this starts a crosslinking reaction in the heat-treatment step to form a film having a high strength thereby fixing the colorant to the fibers of the textile good.

In the case that the crosslinkable binder component contains a solvent, the crosslinkable binder component in the ink composition for inkjet before printing is dispersed or dissolved in the solvent. After the composition is ejected from an inkjet nozzle and landed onto the textile good, it forms a film with wrapping the colorant by evaporation of the solvent, and/or it forms a film with wrapping the colorant by melting or softening thereof in the heat-treatment step, and in addition, a crosslinking reaction starts in the heat-treatment step to form a film having a high strength. With this, the colorant is fixed to the fibers of the textile good.

Illustrative examples of the mixture of a crosslinking agent with a resin having a crosslinkable functional group include: a mixture in which an isocyanate compound is used as the crosslinking agent and a resin having a hydroxy group or a carboxy group is used as the resin having a crosslinkable functional group; a mixture in which an epoxy compound is used as the crosslinking agent and a resin having a hydroxy group or a carboxy group is used as the resin having a crosslinkable functional group; and a mixture in which a compound having an oxazoline group is used as the crosslinking agent and a resin having a carboxy group, an epoxy group, a thiol group, or a phenol group is used as the resin having a crosslinkable functional group.

The isocyanate compound as the crosslinking agent include an isocyanate having 2 or more isocyanate groups and derivatives thereof. Illustrative examples thereof include a water-dispersive isocyanate and a blocked polyisocyanate having a blocked isocyanate group in which an isocyanate group of the isocyanate is protected with a blocking agent.

Illustrative examples of the isocyanate include: aliphatic diisocyanates such as hexamethylene-1,6-diisocyanate, decamethylene diisocyanate, 2,2,4-trimethylhexamethylene-1,4-diisocyanate, and lysine diisocyanate; aliphatic triisocyanates such as 1,3,6-hexamethylene triisocyanate; aromatic diisocyanates such as diphenylmethane-4,4'-diisocyanate, p-phenylene diisocyanate, 2,4-tolylene diisocyanate, 2,6-tolylene diisocyanate, and 1,5-naphthalene diisocyanate; and aromatic triisocyanates such as triphenylmethane triisocyanate.

Illustrative examples of the blocking agent to protect the isocyanate group include lower alcohols (methanol and the like), a phenol, an aliphatic mercaptan, an aromatic mercaptan, hydrocyanic acid (HCN), secondary aromatic amines (N-methyl aniline and the like), oximes (methyl ethyl ketoxime and the like), active ethylene compounds (acetylacetone and the like), lactams (ε-caprolactam and the like), and bisulfate salts. The blocking agent may be appropriately selected in accordance with the temperature and so forth to cause dissociation thereof with the heat-treatment.

In the case that the blocked polyisocyanate is used, a dissociation catalyst of the blocking agent may be used. In the case that the alcohol is used as the blocking agent, illustrative examples of the dissociation catalyst include tertiary amines such as N-methyl morpholine, tin compounds such as 1,3-diacetoxy tetrabutyl stannoxane, and titanium compounds such as tetrakis(2-ethylhexyl) titanate and tetrabutoxy titanium.

The compound having an oxazoline group as the crosslinking agent include oxazoline compounds having two or more oxazoline groups. Illustrative examples thereof include a radical-polymerized polymer of a monomer having an oxazoline group such as 2-isopropenyl-2-oxazoline or 2-vinyl-2-oxazoline. With regard to the polymer having the oxazoline group, for example, Epocros (registered trade mark) manufactured by Nippon Shokubai Co., Ltd. may be used.

The epoxy compound as the crosslinking agent include epoxy compounds having two or more epoxy groups. Illustrative examples thereof include triglycidyl isocyanurate and epoxy cyclohexylmethyl-3,4-epoxy cyclohexane carboxylate.

Illustrative examples of the resin having a hydroxy group include a urethane resin, an acrylic resin having a hydroxy group, which is obtained by copolymerization of an acrylic monomer with a monomer having a hydroxy group, a terpene resin having a hydroxy group, which is obtained by copolymerization of a terpene with a monomer having a hydroxy group, and a styrene-butadiene resin having a hydroxy group, which is obtained by copolymerization of a styrene monomer, a butadiene monomer, and a monomer having a hydroxy group. Among them, a urethane resin is preferable because the printed product that is superior in a friction fastness can be obtained.

Illustrative examples of the resin having a carboxy group include polyacrylic acid and ethylene-acrylic acid copolymers.

Illustrative examples of the resin having a carboxy group include a copolymer of bisphenol A with epichlorohydrin and a copolymer of bisphenol F with epichlorohydrin.

In the mixture of the crosslinking agent with the resin having a crosslinkable functional group, a catalyst to facilitate the crosslinking reaction may be contained. Examples thereof include a catalyst to facilitate a urethane reaction of a polyisocyanate compound with a resin having a hydroxy group. Specific examples of the catalyst include tertiary amines such as triethylamine, triethylene diamine, and hexamethylene tetramine, phosphoric acid, dimethyl phosphate, di-n-butyl phosphate, p-toluene sulfonic acid, and potassium oleate. These catalysts may be used singly, or two or more of them may be concurrently used.

Illustrative examples of the self-crosslinkable resin include a self-crosslinkable urethane resin, a self-crosslinkable acrylic resin, a self-crosslinkable terpene resin, a self-crosslinkable styrene-butadiene resin, an acrylic resin having a silane coupling group, a terpene resin having a silane coupling group, and a styrene-butadiene resin having a silane coupling group.

The self-crosslinkable urethane resin include a urethane resin having a blocked isocyanate group, in which a terminal isocyanate is protected with a blocking agent. The blocking agent of the urethane resin include same blocking agents as those mentioned as the blocking agent in the compound having the blocked isocyanate group, the compound being used as the crosslinking agent. The blocking agent may be appropriately selected in accordance with the heat-treatment temperature and the like for dissociation.

In the case that the self-crosslinkable urethane resin is used, a dissociation catalyst of the blocking agent may be used. The dissociation catalysts include same dissociation catalysts as those mentioned as the dissociation catalyst used for the blocking agents in the compound having the blocked isocyanate group, the compound being used as the cross-linking agent.

Illustrative examples of the self-crosslinkable acrylic resin include resins obtained by copolymerization of a monomer such as an acrylate ester and a methacrylate ester with a monomer having a functional group such as a carboxylic acid group, a carboxylic acid anhydride group, an amino group, a hydroxy group, or an epoxy group, namely, an acrylic resin having a carboxy group, an acrylic resin having an amino group, an acrylic resin having a hydroxy group, and an acrylic resin having an epoxy group.

The specific examples of the self-crosslinkable acrylic resin include self-crosslinkable acrylic emulsions (UX-319SX, UW-600, and UW-550CS; manufactured by Taisei Fine Chemical Co., Ltd.).

Illustrative examples of the self-crosslinkable terpene resin include resins obtained by copolymerization of a monomer such as α-pinene, β-pinene, or limonene with a monomer having a functional group such as a carboxylic acid group, a carboxylic acid anhydride group, an amino group, a hydroxy group, or an epoxy group, namely, a terpene resin having a carboxy group, a terpene resin having an amino group, a terpene resin having a hydroxy group, and a terpene resin having an epoxy group.

Illustrative examples of the self-crosslinkable styrene-butadiene resin include resins obtained by copolymerization of styrene or butadiene, and a monomer having a functional group such as a carboxylic acid group, a carboxylic acid anhydride group, an amino group, a hydroxy group, or an epoxy group, namely, a styrene-butadiene resin having a carboxy group, a styrene-butadiene resin having an amino group, a styrene-butadiene resin having a hydroxy group, and a styrene-butadiene resin having an epoxy group.

Illustrative examples of the resin having a silane coupling group include resins obtained by introducing a silane coupling group by hydrosilylation reaction to corresponding resins.

The silane coupling group is the group to form a siloxane bond by hydrolysis or dehydration condensation. Illustrative examples thereof include an alkoxy silane group, an alkylcarboxy silane group, a halogenated silane group, and a silazane group.

The crosslinkable binder component may be a one liquid type crosslinkable binder component or a two liquid type crosslinkable binder component (including a poly-liquid type crosslinkable binder component). The two component crosslinkable binder component has a high stability and a long life of an ink before mixing each solution; and thus, when used within a pot life, a high reactivity can be obtained after mixing, so that the printed product that is superior in a friction fastness can be obtained.

Illustrative examples of the two component crosslinkable binder component include a mixture of a liquid containing the resin having a crosslinkable functional group with a liquid containing the crosslinking agent, a mixture of a liquid containing the resin having a crosslinkable functional group and the crosslinking agent with a liquid containing the catalyst, and a mixture of a liquid containing the resin having a crosslinkable functional group and the catalyst with a liquid containing the crosslinking agent.

There is no particular restriction in the form of the resin that constitutes the crosslinkable binder component; but for example, a dispersion solution in which a resin in the form of microparticles is dispersed in a water solvent, and a latex thereof are preferable.

Although there is no particular restriction in the content of the crosslinkable binder component in the ink composition for inkjet to be used in this embodiment, the content thereof is preferably in the range of 1% to 30% by mass, while more preferably in the range of 5% to 20% by mass, in the ink composition for inkjet.

(Other Components)

The ink composition for inkjet to be used in this embodiment may contain other components so far as an addition thereof does not impair the present disclosure. Illustrative examples of the other component include a solvent, a disperser, a polymerization inhibitor, a surface-active agent, a filler, a dye, a plasticizer, a surface controlling agent, a flame retardant, a leveling agent, an antifoaming agent, an antioxidant, an electric charge rendering agent, a disinfectant, an antiseptic, a deodorant, an anti-aging agent, an electric charge controller, a wetting agent, an anti-filming agent, and a fragrance.

(Solvent)

In the case that the inkjet printing is difficult only with the colorant and the crosslinkable binder component because the crosslinkable binder component is a solid, high in the viscosity thereof, or the like, a solvent may be contained in the ink composition for inkjet so as to disperse the colorant and to disperse or dissolve the crosslinkable binder component, thereby enabling the ink component to be ejected through an inkjet nozzle. Illustrative examples of the solvent include water, a hydrophilic solvent such as a water-soluble organic solvent, and a hydrophobic solvent such as an aliphatic hydrocarbon and an aromatic hydrocarbon, while a mixture of water with a water-soluble organic solvent is preferable.

With regard to water, an ion-exchanged water, a distilled water, and the like may be used. In the case that water is used as the solvent, although there is no particular restriction in the content of the water in the ink composition for inkjet, the content thereof is preferably in the range of 30% to 80% by mass, while more preferably in the range of 40% to 60% by mass, in the ink composition for inkjet.

There is no particular restriction in the water-soluble organic solvent so far as the solvent is an organic solvent dissolvable in or compatible with water. Illustrative examples thereof include alcohols, ethers, and esters.

Illustrative examples of the alcohols include mono-ols such as methanol, ethanol, propanol, and butanol; diols such as propylene glycol, diethylene glycol, 1,2-butane diol, and 1,4-butane diol; and triols such as glycerol and 1,2,4-butane triol.

Illustrative examples of the ethers include diethyl ether, propylene glycol monomethyl ether, and tetrahydrofuran.

Illustrative examples of the esters include methyl acetate, ethyl acetate, propyl acetate, butyl acetate, and γ-lactone.

These water-soluble organic solvents may be used singly, or two or more of them may be concurrently used.

In the case that the water-soluble organic solvent is used, although there is no particular restriction in the content of the water-soluble organic solvent in the ink composition for inkjet, the content thereof is preferably in the range of 10% to 50% by mass, while more preferably in the range of 20% to 40% by mass, in the ink composition for inkjet.

Illustrative examples of the hydrophobic solvent include aliphatic hydrocarbons such as pentane, hexane, heptane, and octane; and aromatic hydrocarbons such as benzene, toluene, and xylene.

In the case that water is used as the solvent, there is no particular restriction in the disperser so far as it can disperse the colorant into water; for example, the dispersers include a low molecular weight disperser or a polymer disperser, these having a hydrophilic portion and a hydrophobic portion. It must be noted here that in the case that a pigment that is modified with a functional group or a self-dispersive pigment such as a microencapsulated pigment that is covered with a resin is used as the colorant, the disperser is not necessary.

Specific examples of the disperser include nonionic, cationic, and anionic surface-active agents, polyester-type polymer dispersers, acryl-type polymer dispersers, and polyurethane-type polymer dispersers. Among them, in view of dispersibility, polymer dispersers are preferable.

Illustrative examples of the commercially available disperser include pigment dispersers manufactured by Nippon Lubrizol Industry Corp. (Solsperse 74000, 82500, 83500, V350, W200, WV 400, J180, and 39000) and polymer-type pigment dispersers manufactured by Ajinomoto Fine-Techno Co., Inc. (Ajisper PB821, PB822, PB824, PB881, PN411, and PA111).

In the case that the disperser is used, although there is no particular restriction in the content of the disperser so far as the colorant can be dispersed to the disperser, the content thereof is preferably in the range of 1% to 30% by mass, while more preferably in the range of 5% to 20% by mass, in the ink composition for inkjet.

Depending on the production method, there is no restriction in the ink composition for inkjet to be used in this embodiment. For example, the ink composition may be prepared by stirring with a physical method in which a colorant, a crosslinkable binder component, and other component such as a solvent, which is added when necessary, are mixed and dispersed with a stirrer or an emulsifier such as a homogenizer and a colloid mill, or with a physicochemical method in which dispersion is carried out with a phase inversion emulsification method, a surfactant phase emulsification method, a phase inversion temperature emulsification method, or the like.

In the case that the ink composition for inkjet to be used in this embodiment is a two component, for example, a main material and a curing agent are separated and mixed in advance of their use. For example, in the case that the crosslinkable binder component is a mixture of a crosslinking agent with a resin having a crosslinkable functional group, a component blended with the crosslinking agent and a blended solution containing the separated resin having a crosslinkable functional group each are prepared, and they are mixed in advance of their use.

(Textile Good)

There is no particular restriction in the fiber that constitutes the textile good to which the ink composition for inkjet as described above is inkjet-printed. The fiber may be a natural fiber or a chemical fiber.

Illustrative examples of the natural fiber include: plant fibers such as cotton and hemp; animal fibers such as silk, wool, and animal hair; and mineral fibers such as asbestos and basalt fiber.

Illustrative examples of the chemical fiber include organic synthetic fibers such as a polyester fiber, a nylon fiber, an acrylic fiber, a polyamide fiber, a polypropylene fiber, a polyethylene fiber, a polyvinyl alcohol fiber, a polyvinyl chloride fiber, a polyvinylidene chloride fiber, a polyurethane fiber, a polyalkyl p-oxybenzoate fiber, a polytetrafluoroethylene fiber, and an aramide fiber; inorganic synthetic fibers such as a glass fiber, a carbon fiber, and a metal fiber; regenerated fibers such as rayon, chitin, and collagen fibers; acetate and triacetate fibers; and a single fiber of them or a composite fiber of them. Among them, the present disclosure is preferable in the plant fibers, the animal fibers, and the chemical fibers, more preferable in the cotton, the hemp, and the polyester fiber, while particularly preferable in the cotton.

There is no particular restriction in the form of the textile good so far as the textile good contains a fiber as a constituting element thereof. Illustrative examples of the form include: a thread, a button, and a rope derived from a long fiber; a paper derived from a short fiber; and a textile, a web, and an unwoven fabric derived from a thread. Among them, the present disclosure is preferable for the textile, the web, and the unwoven cloth.

Although the textile good may be used as it is, the textile having contained therein a binder component in advance is more preferably used.

When the textile good includes the binder component in advance, the textile good can be entirely coated with the binder by the heat in the heat-treatment step to be mentioned later so that the fastness of the printed product can be enhanced. In addition, the colorant is tucked with the binder component in the textile good and with the crosslinkable binder component used in the ink composition for inkjet so that the colorant can be fixed more firmly. In addition, by causing the textile good to include the binder component in advance, the crosslinkable binder component to be used in the ink composition for inkjet can be reduced with retaining the fastness. Therefore, the total amount of the crosslinkable binder component and the binder component to be attached to the textile good in advance can be reduced so that the texture of the fabric can be retained.

Illustrative examples of the binder component to be contained in the textile good include a thermally adhesive resin such as a thermosetting resin and a thermoplastic resin.

Illustrative examples of the thermosetting resin include a urethane resin, a phenol resin, and an epoxy resin. Illustrative examples of the thermoplastic resin include olefin resins such as a polyethylene resin and a polypropylene resin, and an acrylic resin. Among them, a urethane resin, an acrylic resin, and an olefin resin are preferable, while a polyethylene resin is more preferable.

There is no particular restriction in the method for containing the binder component into the textile good to be inkjet-printed. Illustrative examples of the method include: a method in which a solution having the binder component dissolved or dispersed in a solvent is prepared as a pretreatment solution, and then, after at least part of a textile good or preferably a whole thereof is soaked in the pretreatment solution, the textile good thus treated is squeezed with a roller or the like and then dried to fix it to the fibers of the textile good; and a method in which the pretreatment solution is applied to the textile good and then dried to fix it to the fibers of the textile good.

The solvent to be used in the pretreatment solution may be the same as the solvents used in the ink composition for inkjet as mentioned before.

In the case that the pretreatment solution uses water as the solvent, a dispersion solution having the binder component in the form of microparticles dispersed in water solvent, or a latex thereof may be used.

In the case that the binder component in the form of microparticles is used, there is no particular restriction in the particle diameter of the binder component. For example, the microparticles whose average particle diameter is in the range of 10 nm to 200 µm, while preferably in the range of 0.1 to 20 µm, may be used.

There is no particular restriction in the content of the binder component in the pretreatment solution. Mass of the solid component of the binder component in the pretreatment solution is preferably in the range of 0.1% to 10% by mass, and more preferably in the range of 1% to 5% by mass, while particularly preferably in the range of 1.5% to 3% by mass.

In the case that the textile good includes the binder component, although there is no particular restriction in the content of the binder component, the content thereof per 1 $m^2$ of the area of the textile good is preferably in the range of 0.1 to 100 g, and more preferably in the range of 0.5 to 50 g, while particularly preferably in the range of 1 to 20 g.

It is preferable that the textile good to be inkjet-printed contain an organic salt or an inorganic salt as an adjuvant. When the textile good contains an organic salt or an inorganic salt as an adjuvant, dispersibility of the colorant in the ink composition that is landed on the textile good is destroyed thereby depositing the colorant in the place where the colorant exists so that the fixing power thereof is increased thereby leading to prevention of the bleeding thereof.

There is no particular restriction in the inorganic salt so far as the salt is formed of an anion of an inorganic compound and a cation of an inorganic compound. Specific examples of the inorganic salt include a salt formed of an anion of an acid not containing a carbon atom such as hydrochloric acid, sulfuric acid, nitric acid, phosphoric acid, and chromic acid, and an inorganic acid such as carbonic acid, cyanic acid and hydrocyanic acid, and a cation such as an alkali metal cation, an alkaline earth metal cation, and a metal ion.

There is no particular restriction in the organic salt so far as the organic salt is the salt other than the salt of the above-mentioned inorganic salt. For example, this may be a salt formed of an anion of an organic compound and a cation of an inorganic compound, a salt formed of an anion of an inorganic compound and a cation of an organic compound, and a salt formed of an anion of an organic compound and a cation of an organic compound. Illustrative examples of the anion of an organic compound include anions of formic acid, acetic acid, lactic acid, and benzoic acid. Illustrative examples of the cation of an organic compound include an ammonium, an imidazolium, and a pyridinium. The anion of an inorganic compound and the cation of an inorganic compound include the ions same as those mentioned in the organic salt.

Among these adjuvants, in view of safety, organic salts are preferable; a salt formed of an anion of lactic acid and a cation of an alkaline earth metal is more preferable; and calcium lactate is particularly preferable.

There is no particular restriction in the method for containing the adjuvant in the textile good. Illustrative example of the method include: a method in which a solution having the adjuvant dissolved or dispersed in a solvent is prepared as the pretreatment solution, and then, after at least part of a textile good or preferably a whole thereof is soaked in the pretreatment solution, the textile good thus treated is squeezed with a roller or the like and then dried to fix the adjuvant to the fibers of the textile good; and a method in which the pretreatment solution is applied to the textile good and then dried to fix the adjuvant to the fibers of the textile good.

There is no particular restriction in the medium in which the adjuvant is contained. The medium may be water and an organic solvent. There is no particular restriction in the content of the adjuvant in the pretreatment solution. The content thereof is preferably in the range of 0.1% to 10% by mass, and more preferably in the range of 1% to 5% by mass, while particularly preferably in the range of 1.5% to 3% by mass.

In the case that the textile good includes the adjuvant, there is no particular restriction in the content of the adjuvant so far as the content is within the range in which dispersibility of the colorant in the ink composition that is landed on the textile good can be destroyed. The content thereof per 1 $m^2$ of the area of the textile good is preferably in the range of 0.1 to 100 g, and more preferably in the range of 0.5 to 50 g, while particularly preferably in the range of 1 to 20 g.

The pretreatment solution containing the adjuvant may also concurrently include the resin to be contained in the textile good to which the inkjet-printing is carried out.

(Inkjet Printing)

In the printing step, a print body is obtained by ejecting the ink composition for inkjet from a nozzle of an inkjet printer to the textile good.

Depending on the printing apparatus to be used, there is no restriction with regard to the printing step. For example, printing may be carried out by using a usual inkjet printer and the like. More specifically, the printing apparatus includes an apparatus that is provided with, for example, a storage member of the ink composition for inkjet and an inkjet nozzle connected to the storage member via a tube. In the case that a two component is used as the ink composition for inkjet, the printing apparatus usable may be the one that is provided with, for example, a storage member for a first solution and a storage member for a second solution; a first control valve and a second control valve that are connected to the respective storage members thereby controlling the flow rates of respective solutions; a mixing member that is connected to the respective control valves and mixes the first solution with the second solution to prepare a mixed ink; and an inkjet nozzle connected to the mixing member via a tube.

There is no particular restriction in the ejection amount of the ink.

There is no particular restriction in the ink temperature of the ink composition for inkjet to be ejected. The printing may be carried out under the condition that the crosslinkable binder component in the ink composition for inkjet does not undergo a crosslinking reaction. Specifically, the inkjet printing may be carried out, for example, with the temperature of the print body preferably in the range of 0 to 100° C., and more preferably in the range of 10 to 40° C., while particularly preferably in the range of 20 to 30° C.

In the print body, the ink composition for inkjet, containing the colorant, the crosslinkable binder component, and other additive such as a solvent, which is added as necessary, is attached on the fibers of the textile good. In the method for producing a printed product according to this embodiment, in the case that the ink composition for inkjet contains a solvent, this solvent can be evaporated in the heat-treatment step to be described later; but a drying step to evaporate the solvent may be arranged before the heat-treatment step to be described later. When the solvent starts to evaporate, the crosslinkable binder component having the colorant wrapped therein starts to form a film on the fibers of the textile good. The drying step may be carried out in the temperature range of, for example, 80 to 120° C.

(Heat-Treatment Step)

In the heat-treatment step, the print body obtained in the printing step is heat-treated with steam to cause the crosslinkable binder component melt or soften, and to crosslink to be a film. With this, the colorant is fixed to the fibers of the textile good.

The heat-treatment of the print body is carried out, for example, by blowing steam, which is formed by heating a liquid water, to the print body. Especially, it is preferable that the print body be heated via the steam, without directly contacting the print body with a heat source.

Depending on the equipment to be used, there is no restriction with regard to the heat-treatment step. This step may be carried out by using the heat-treatment equipment with which the print body is heat-treated with steam. The heat-treatment equipment like this may be provided with, for example, a water supplying means to supply a liquid water, a heat source to heat the liquid water thus supplied thereby generating steam by gasification thereof, a heat source to further heat the steam if necessary, and a blowing means such as a nozzle to blow the steam to the print body.

Thermal conductivity of the steam is so high that not only the heating time can be made shorter but also the oxygen concentration therein can be lowered to 1% or less, for example. Accordingly, it is difficult to cause quality change such as scorch in the fibers of the fabric so that softness of the textile good can be retained thereby improving the texture thereof. In addition, not only the temperature does not rise up so excessively as in the case of a heat pat method in which the fibers are exposed directly to a high temperature of a heat source, but also the heating time can be made shorter because the steam is used as a heat conductor; and thus, softness of the textile good can be retained thereby improving the texture thereof, and in addition, it becomes difficult to cause quality change in the fabric.

Furthermore, use of the steam in the heat-treatment step is preferable because the textile good swells with the water of the steam thereby facilitating penetration of the ink composition containing the colorant between the fibers, resulting in enhancement of the fastness of the printed body thus obtained.

The steam is, for example, a saturated water vapor with the temperature of 100° C. or a super-heated steam whose temperature is further raised up by heating further the saturated water vapor having the temperature of 100° C. The steam is preferably the super-heated steam. By using the super-heated steam, the heating can be done at a further higher temperature, so that within a short period of time the crosslinkable binder component can be melted or softened, and be crosslinked.

There is no particular restriction in the heating temperature in the heat-treatment step so far as the temperature is such that the crosslinkable binder component can melt or soften, and also that the crosslinking reaction of the crosslinkable binder component can take place. For example, the temperature is preferably in the range of 150 to 240° C., while more preferably in the range of 160 to 185° C. When the heating temperature is high, in the crosslinkable binder component, conversion to a film thereof and penetration of the colorant tend to be facilitated thereby enhancing the fastness of the printed product; when the heating temperature is low, deterioration in the texture of the fabric tends to be prevented. Here, the heating temperature means the temperature of the atmosphere in which the print body is disposed.

There is no particular restriction in the heating time in the heat-treatment step. The heating time is determined in accordance with the heating temperature and the like. For example, the heating can be carried out in the temperature range of 150 to 190° C. for 3 to 15 minutes. More specifically, when the heating is carried out in the temperature range of 165 to 185° C. for 6 minutes, or in the temperature range of 165 to 180° C. for 10 minutes, the printed product is superior in the fastness and the texture.

When the heating time is longer, in the crosslinkable binder component, conversion to a film thereof and penetration of the colorant tend to be facilitated thereby enhancing the fastness of the printed product; when the heating time is shorter, it is more difficult to cause the quality change such as scorch in the fabric so that deterioration in the texture of the fabric tends to be prevented furthermore.

(Printing System)

Depending on the equipment to be used, there is no particular restriction in the method for producing a printed product according to the present disclosure. It is preferable to carry out the method with a printing system having a printing apparatus and heat-treatment equipment with which a print body after printing is heat-treated with steam. When the printing system like this is used, the printed product, which is the textile discharged from the heat-treatment equipment after the heat treatment, can be rolled up with a roller as it is without going through a special drying step. Namely, because a liquid component such as a solvent in the ink composition for inkjet having been printed to a textile good such as a textile is evaporated in the heat-treatment equipment, the printed product, which is the textile discharged from the heat-treatment equipment after the heat treatment, can be rolled up as it is.

EXAMPLES

Hereinafter, the present disclosure will be explained on the basis of Examples, but the present disclosure is not limited to these Examples. Performance tests of the printed products were carried out by the methods described below.

(1) Fastness

Fastness was measured with the method using a friction tester II type (Gakusin-type) on the basis of "Test methods for color fastness to rubbing" (JIS L 0849:2013).

COMPARATIVE EXAMPLES (HEAT PAT METHOD)

Comparative Example 1-1

A cotton cloth was soaked in a pretreatment agent (aqueous dispersion solution formed of 1% by mass of polyethylene resin, 96% by mass of water, and 3% by mass of calcium lactate) at room temperature for 1 minute; and then, it was taken out from the solution and then dried to obtain a cloth to be printed.

Figure 2:
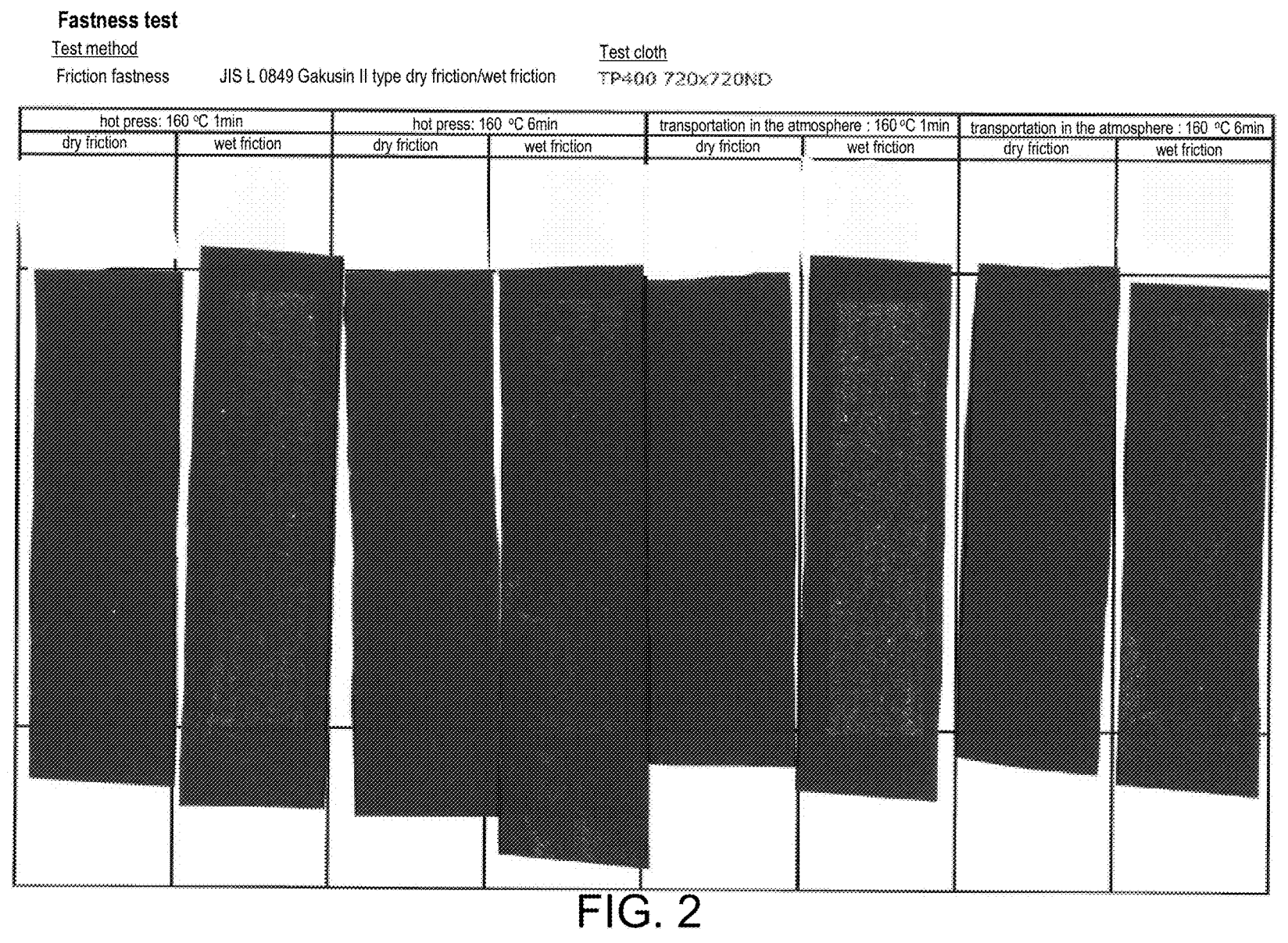

An ink composition 1-1, containing a colorant, and a urethane resin and a blocked isocyanate as a crosslinkable binder component, was inkjet-printed with an inkjet printer onto the cloth to be printed to obtain a print body R1-1. The print body R1-1 was heat-treated by a hot press under the condition with the temperature of 160° C. and the time of 1 minute to fix the ink, and thus, the printed body R1-1 was obtained. The printed body R1-1 was cut out to test pieces each having the size of about 220 mm×30 mm; and then, the test pieces for a dry test and for a wet test were subjected to a fastness test. The test results are summarized in Table 1. The pictures of the test pieces (R1-1) after the fastness test (discoloration) are illustrated in FIG. 2. The test piece in the strip form in the first row from the left is the picture taken after the dry friction test, and the test piece in the strip form in the second row from the left is the picture taken after the wet friction test. In the wet friction test, there is scraping.

Comparative Examples 1-2 and 1-3

Printed bodies R1-2 and R1-3 were obtained in the same way as Comparative Example 1-1 except that the conditions of the hot press were changed to 170° C. for 1 minute and 160° C. for 6 minutes, respectively, and then, the test pieces thereof were subjected to a fastness test. The test results are summarized in Table 1. The pictures of the test pieces (R1-3) after the fastness test are illustrated in FIG. 2. The test piece in the strip form in the third row from the left is the picture taken after the dry friction test, and the test piece in the strip form in the fourth row from the left is the picture taken after the wet friction test. In the wet friction test, there is scraping.

Comparative Examples 1-4, 1-5, and 1-6

Printed bodies R1-4, R1-5, and R1-6 were obtained in the same way as Comparative Example 1-1 except that the conditions of the hot press were changed to 170° C. for 6 minutes, 160° C. for 10 minutes, and 170° C. for 10 minutes, respectively. All the printed bodies R1-4, R1-5, and R1-6 generated a scorch during a hot press. In the case that the heating is carried out by a heat pat method, it is presumed that because the print body comes into contact with a heat pat, the textile is exposed directly to a hot temperature of a heat source thereby facilitating generation of the scorch.

each having the size of about 220 mm×30 mm; and then, the test pieces for a dry test and for a wet test were subjected to a fastness test. The test results are summarized in Table 2. It can be found that the fastness of the printed body R2-1 is low.

Comparative Examples 2-2, 2-3, and 2-4

Printed bodies R2-2, R2-3, and R2-4 were obtained in the same way as Comparative Example 2-1 except that the conditions of the heating with the heater were changed to 165° C. for 6 minutes, 170° C. for 6 minutes, and 175° C. for 6 minutes, respectively, and then, the test pieces thereof were subjected to a fastness test. The results are summarized in Table 2.

Comparative Examples 2-5 and 2-6

Printed bodies R2-5 and R2-6 were obtained in the same way as Comparative Example 2-1 except that the conditions of the heating with the heater were changed to 180° C. for 6 minutes and 185° C. for 6 minutes, respectively. Both the printed bodies R2-5 and R2-6 generated a scorch during heating with the heater.

Comparative Examples 2-7, 2-8, and 2-9

Printed bodies R2-7, R2-8, and R2-9 were obtained in the same way as Comparative Example 2-1 except that the conditions of the heating with the heater were changed to 160° C. for 10 minutes, 165° C. for 10 minutes, and 170° C. for 10 minutes, respectively, and then, the test pieces thereof were subjected to a fastness test. The test results are summarized in Table 2.

Comparative Examples 2-10, 2-11, and 2-12

Printed bodies R2-10, R2-11, and R2-12 were obtained in the same way as Comparative Example 2-1 except that the conditions of the heating with the heater were changed to 175° C. for 10 minutes, 180° C. for 10 minutes, and 185° C. for 10 minutes, respectively. All the printed bodies R2-10, R2-11, and R2-12 generated a scorch during heating with the heater.

TABLE 1

| Heat-treatment time | | 1 minute | | 6 minutes | | 10 minutes | |
|---|---|---|---|---|---|---|---|
| | Kind | Stain | Discoloration | Stain | Discoloration | Stain | Discoloration |
| Temperature | 160° C. | Dry: class 4 Wet: class 3 | Dry: class 4 to 5 Wet: class 3 | Dry: class 4 to 5 Wet: class 3 to 4 | Dry: class 4 Wet: class 3 | (Scorch) | (Scorch) |
| | 165° C. | | | | | | |
| | 170° C. | Dry: class 4 to 5 Wet: class 3 to 4 | Dry: class 4 to 5 Wet: class 3 to 4 | (Scorch) | (Scorch) | (Scorch) | (Scorch) |
| | 175° C. | | | | | | |
| | 180° C. | | | | | | |
| | 185° C. | | | | | | |

Comparative Examples 2 (Thermosol Method)

Comparative Example 2-1

A print body R2-1 was obtained in the same way as Comparative Example 1-1. The print body R2-1 was heat-treated under the condition at 160° C. for 6 minutes to fix the ink by using a heater under an atmosphere of a normal pressure and a normal humidity (relative humidity in the range of 45% to 85%), and thus, the printed body R2-1 was obtained. The printed body R2-1 was cut out to test pieces for 10 minutes, respectively. All the printed bodies R2-10, R2-11, and R2-12 generated a scorch during heating with the heater.

Comparative Example 2-13

Printed body R2-13 was obtained in the same way as Comparative Example 2-1 except that the condition of the heating with the heater was changed to 160° C. for 15 minutes, and then the test piece thereof was subjected to a fastness test. The test result is summarized in Table 2.

Comparative Examples 2-14, 2-15, and 2-16

Printed bodies R2-14, R2-15, and R2-16 were obtained in the same way as Comparative Example 2-1 except that the conditions of the heating with the heater were changed to 175° C. for 15 minutes, 180° C. for 15 minutes, and 185° C. for 15 minutes, respectively. All the printed bodies R2-14, R2-15, and R2-16 generated a scorch during heating with the heater.

In Comparative Examples 2, as compared with Comparative Examples 1, a high fastness could be obtained by the heat-treatment carried out at higher temperatures and for longer times; and the range of the temperature and time of the heat-treatment not generating a scorch of the fabric and not causing deterioration of the texture such as hardening thereof became wide as compared with Comparative Examples 1. It is presumed that because heating is carried out by a thermosol method, the heat source does not contact with a printing face thereby suppressing excessive temperature rise caused by direct exposure of the print body to a high temperature of the heat source.

Examples 1-7, 1-8, 1-9, 1-10, and 1-11

Figure 3:
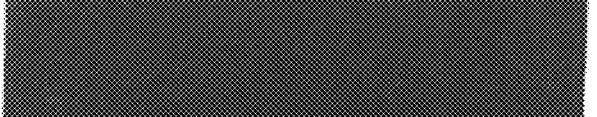
FIG. 3 is pictures of the printed products according to Example.

Printed bodies E1-7, E1-8, E1-9, E1-10, and E1-11 were obtained in the same way as Example 1-1 except that the conditions of the heat-treatment with the super-heated steam were changed to 160° C. for 10 minutes, 165° C. for 10 minutes, 170° C. for 10 minutes, 175° C. for 10 minutes, and 180° C. for 10 minutes, respectively, and then, the test pieces thereof were subjected to a fastness test. The test results are summarized in Table 3. The pictures of the test pieces (E1-10) after the fastness test are illustrated in FIG. 3. The test piece in the strip form in the second row from the left is the picture taken after the dry friction test, and the test piece in the strip form in the third row from the left is the picture taken after the wet friction test. It can be found that there is no scraping in any of them. The texture of them almost unchanged from the texture before printing.

Example 1-12

Printed body E1-12 was obtained in the same way as Example 1-1 except that the condition of the heat-treatment

TABLE 2

| Heat-treatment time | 6 minutes | | 10 minutes | | 15 minutes | |
|---|---|---|---|---|---|---|
| Kind | Stain | Discoloration | Stain | Discoloration | Stain | Discoloration |
| Temperature 160° C. | Dry: class 2<br>Wet: class 1 to 2 | Dry: class 4 to 5<br>Wet: class 2 | Dry: class 2<br>Wet: class 2 | Dry: class 4 to 5<br>Wet: class 2 to 3 | Dry: class 2 to 3<br>Wet: class 2 to 3 | Dry: class 4 to 5<br>Wet: class 2 to 3 |
| 165° C. | Dry: class 3<br>Wet: class 2 to 3 | Dry: class 4 to 5<br>Wet: class 2 to 3 | Dry: class 3<br>Wet: class 2 to 3 | Dry: class 4 to 5<br>Wet: class 3 to 4 | | |
| 170° C. | Dry: class 3<br>Wet: class 3 | Dry: class 4 to 5<br>Wet: class 3 to 4 | Dry: class 3 to 4<br>Wet: class 3 to 4 | Dry: class 4 to 5<br>Wet: class 3 to 4 | (Scorch) | (Scorch) |
| 175° C. | Dry: class 3<br>Wet: class 3 to 4 | Dry: class 3 to 4<br>Wet: class 3 | (Scorch) | (Scorch) | (Scorch) | (Scorch) |
| 180° C. | (Scorch) | (Scorch) | (Scorch) | (Scorch) | (Scorch) | (Scorch) |
| 185° C. | (Scorch) | (Scorch) | (Scorch) | (Scorch) | (Scorch) | (Scorch) |

Examples 1

Example 1-1

A print body E1-1 was obtained in the same way as Comparative Example 1-1. By using super-heated steam generating equipment, a super-heated steam with the temperature of 160° C. was blown to the print body E1-1 under a normal pressure for 6 minutes so as to fix the ink with a heat-treatment of a HT steam method, and thus, the printed body E1-1 was obtained. The printed body E1-1 was cut out to test pieces each having the size of about 220 mm×30 mm; and then, the test pieces for a dry test and for a wet test were subjected to a fastness test. The test results are summarized in Table 3. The texture thereof almost unchanged from the texture before printing.

Examples 1-2, 1-3, 1-4, 1-5, and 1-6

Printed bodies E1-2, E1-3, E1-4, E1-5, and E1-6 were obtained in the same way as Example 1-1 except that the conditions of the heat-treatment with the super-heated steam were changed to 165° C. for 6 minutes, 170° C. for 6 minutes, 175° C. for 6 minutes, 180° C. for 6 minutes, and 185° C. for 6 minutes, respectively, and then, the test pieces thereof were subjected to a fastness test. The test results are summarized in Table 3. The texture of them almost unchanged from the texture before printing.

with the super-heated steam was changed to 185° C. for 10 minutes. The printed body E1-12 generated a scorch during heating with the super-heated steam.

Example 1-13

Printed body E1-13 was obtained in the same way as Example 1-1 except that the condition of the heat-treatment with the super-heated steam was changed to 160° C. for 15 minutes, and then, the test piece thereof was subjected to a fastness test. The test results are summarized in Table 3. The pictures of the test pieces (E1-13) after the fastness test are illustrated in FIG. 3. The test piece in the strip form in the seventh row from the left is the picture taken after the dry friction test, and the test piece in the strip form in the eighth row from the left is the picture taken after the wet friction test. It can be found that there is no scraping in any of them. The texture thereof almost unchanged from the texture before printing.

Examples 1-14, 1-15, and 1-16

Printed bodies E1-14, E1-15, and E1-16 were obtained in the same way as Example 1-1 except that the conditions of the heat-treatment with the super-heated steam were changed to 175° C. for 15 minutes, 180° C. for 15 minutes, and 185° C. for 15 minutes, respectively. All the printed bodies E1-14, E1-15, and E1-16 generated a scorch during heating with the super-heated steam.

In Examples 1, the range of the temperature and time of the heat-treatment not generating a scorch of the fabric and not causing deterioration of the texture such as hardening thereof became wide as compared with Comparative Examples 1 and Comparative Examples 2. Among the printed bodies E1-1 to E1-16, it can be found that the printed bodies E1-2 to E1-6 and E1-8 to E1-11 have superior fastness. With the heating method of Examples 1, it can be found that the permissible range of the time and temperature not causing the scorch are wide as compared with Comparative Examples 1 and 2 so that the heat-treatment can be carried out at a higher temperature for a longer time thereby enhancing the discoloration of the friction fastness furthermore.

TABLE 3

| Heat-treatment time | | 6 minutes | | 10 minutes | | 15 minutes | |
| --- | --- | --- | --- | --- | --- | --- | --- |
| Kind | | Stain | Discoloration | Stain | Discoloration | Stain | Discoloration |
| Temperature | 160° C. | Dry: class 2 to 3 | Dry: class 4 to 5 | Dry: class 2 to 3 | Dry: class 4 to 5 | Dry: class 2 to 3 | Dry: class 4 to 5 |
| | | Wet: class 2 | Wet: class 3 | Wet: class 2 to 3 | Wet: class 3 | Wet: class 2 to 3 | Wet: class 3 |
| | 165° C. | Dry: class 3 | Dry: class 4 to 5 | Dry: class 3 | Dry: class 4 to 5 | | |
| | | Wet: class 2 to 3 | Wet: class 3 to 4 | Wet: class 2 to 3 | Wet: class 3 to 4 | | |
| | 170° C. | Dry: class 3 | Dry: class 4 to 5 | Dry: class 3 to 4 | Dry: class 4 to 5 | | |
| | | Wet: class 3 | Wet: class 3 to 4 | Wet: class 3 to 4 | Wet: class 4 | | |
| | 175° C. | Dry: class 3 to 4 | Dry: class 4 to 5 | Dry: class 3 | Dry: class 4 to 5 | (Scorch) | (Scorch) |
| | | Wet: class 3 to 4 | Wet: class 4 | Wet: class 3 to 4 | Wet: class 4 | | |
| | 180° C. | Dry: class 3 | Dry: class 4 to 5 | Dry: class 3 | Dry: class 4 to 5 | (Scorch) | (Scorch) |
| | | Wet: class 3 to 4 | Wet: class 3 to 4 | Wet: class 3 to 4 | Wet: class 3 to 4 | | |
| | 185° C. | Dry: class 3 | Dry: class 4 to 5 | (Scorch) | (Scorch) | (Scorch) | (Scorch) |
| | | Wet: class 3 to 4 | Wet: class 4 | | | | |

In the present disclosure, various embodiments and modification can be made without deviating from the spirit and the ranges of the present disclosure in the broad sense. The embodiments described above are to explain this disclosure, not to limit the ranges of the present disclosure. Namely, the range of the present disclosure is not shown by the embodiments but by the claims. Furthermore, various modifications made within the claims and the concept of the disclosure equivalent to the claims are regarded as the scope within this disclosure.

What is claimed is:

1. A method for producing a printed product, comprising:
   a printing step in which an ink composition for inkjet, containing a colorant and a crosslinkable binder component, is inkjet-printed onto a textile good to obtain a print body, wherein the textile good itself contains a binder component in advance; and
   a heat-treatment step in which, by heat-treatment of the print body with steam, the crosslinkable binder component from the ink composition is caused to melt or soften, and to crosslink to be a film, thereby the colorant being tucked with the binder component in the textile good for fixing the colorant to fibers of the textile good,
   wherein the print body is heated by the heat-treatment step in a temperature range of 150 to 190° C. for 3 to 15 minutes.

2. The method for producing a printed product according to claim 1, wherein
   the heat-treatment step with the steam is carried out by heating the print body via the steam without contacting the print body directly to a heat source.

3. The method for producing a printed product according to claim 1, wherein
   the crosslinkable binder component is a two component crosslinkable binder component.

4. The method for producing a printed product according to claim 2, wherein
   the crosslinkable binder component is a two component crosslinkable binder component.

5. The method for producing a printed product according to claim 1, wherein
   the crosslinkable binder component contains a crosslinking agent and a urethane resin.

6. The method for producing a printed product according to claim 2, wherein
   the crosslinkable binder component contains a crosslinking agent and a urethane resin.

7. The method for producing a printed product according to claim 3, wherein
   the crosslinkable binder component contains a crosslinking agent and a urethane resin.

8. The method for producing a printed product according to of claim 1, wherein
   the ink composition for inkjet is a water-based ink further containing water.

9. The method for producing a printed product according to of claim 2, wherein
   the ink composition for inkjet is a water-based ink further containing water.

10. The method for producing a printed product according to of claim 3, wherein
    the ink composition for inkjet is a water-based ink further containing water.

11. The method for producing a printed product according to of claim 5, wherein
    the ink composition for inkjet is a water-based ink further containing water.

12. The method for producing a printed product according to claim 1, wherein
    the textile good contains an organic salt or an inorganic salt as an adjuvant.

13. A printing system, comprising:
    a printing apparatus, configured to perform a printing step in which an ink composition for inkjet, containing a colorant and a crosslinkable binder component, is inkjet-printed onto a textile good to obtain a print body, wherein the textile good itself contains a binder component in advance; and
    a heat-treatment equipment, with which the print body after printing is heat-treated with steam, the crosslinkable binder component from the ink composition is caused to melt or soften, and to crosslink to be a film, thereby the colorant being tucked with the binder component in the textile good for fixing the colorant to fibers of the textile good, wherein the print body is heated by the heat-treatment equipment in a temperature range of 150 to 190° C. for 3 to 15 minutes.

* * * * *